(12) United States Patent
Johnson

(10) Patent No.: US 10,328,832 B2
(45) Date of Patent: Jun. 25, 2019

(54) FLOOR LINER WITH CARPET HOOK RECEPTACLE

(71) Applicant: Husky Liners, Inc., Ann Arbor, MI (US)

(72) Inventor: Kenneth Douglas Johnson, Derby, KS (US)

(73) Assignee: Husky Liners, Inc., Ann Arbor, MI (US)

( * ) Notice: Subject to any disclaimer, the term of this patent is extended or adjusted under 35 U.S.C. 154(b) by 44 days.

(21) Appl. No.: 15/277,097

(22) Filed: Sep. 27, 2016

(65) Prior Publication Data

US 2018/0086243 A1 Mar. 29, 2018

(51) Int. Cl.
*B60N 3/04* (2006.01)

(52) U.S. Cl.
CPC .............. *B60N 3/046* (2013.01); *B60N 3/048* (2013.01); *Y10T 428/24008* (2015.01)

(58) Field of Classification Search
CPC ............ Y10T 428/24008; B60N 3/046; B60N 3/048; A47G 27/0418; A47G 27/0425
See application file for complete search history.

(56) References Cited

U.S. PATENT DOCUMENTS

| 1,535,983 | A | * | 4/1925 | Carr | A47G 27/0418 |
| | | | | | 16/4 |
| 5,620,546 | A | * | 4/1997 | Reuben | A43B 3/0078 |
| | | | | | 156/219 |
| 8,851,551 | B1 | * | 10/2014 | Kaufman | B60N 3/046 |
| | | | | | 16/4 |
| 8,991,006 | B2 | * | 3/2015 | Masanek, Jr. | B60N 3/044 |
| | | | | | 16/21 |

FOREIGN PATENT DOCUMENTS

DE 102008010655 * 9/2009

OTHER PUBLICATIONS

Machine translation of DE102008010655 retrieved Apr. 2018.*

* cited by examiner

*Primary Examiner* — Alexander S Thomas
(74) *Attorney, Agent, or Firm* — Harness, Dickey & Pierce, P.L.C.

(57) ABSTRACT

A vehicle floor liner has a top surface and a bottom surface. The bottom surface includes a recess extending toward the top surface and a ridge extending away from the bottom surface and positioned around a periphery of the recess.

19 Claims, 5 Drawing Sheets

FLOOR LINER WITH CARPET HOOK RECEPTACLE

BACKGROUND

Floor mats and floor liners are inserts that are placed over vehicle carpeting to protect the carpeting from dirt, debris and wear. To prevent floor mats from shifting, vehicle manufacturers place carpet hooks on the floors of their vehicles. These carpet hooks are rigid structures that extend upward from the vehicle floor to engage with openings in the floor mat.

Having openings that pass between the top surface and the bottom surface of a floor mat is undesirable since it allows liquid spilled on the top of the mat to flow underneath the mat where it can stain the carpeting.

The discussion above is merely provided for general background information and is not intended to be used as an aid in determining the scope of the claimed subject matter. The claimed subject matter is not limited to implementations that solve any or all disadvantages noted in the background.

SUMMARY

A vehicle floor liner has a top surface and a bottom surface. The bottom surface includes a recess extending toward the top surface and a ridge extending away from the bottom surface and positioned around a periphery of the recess.

In a further embodiment, a vehicle floor mat includes a frustoconical recess formed in a bottom surface of the mat and a chamber positioned above the frustoconical recess.

In a still further embodiment, a vehicle floor liner includes a carpet hook receptacle with a chamber having a top, a bottom and sides extending from the top to the bottom. The bottom includes an opening having a central portion and at least one lobe extending from the central portion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The embodiments described below provide a floor mat with a sealed carpet hook receptacle. The sealed carpet hook receptacle is defined by a formed unbroken sheet of material so that liquid cannot penetrate from a top surface of the floor mat to a bottom surface of the floor mat through the carpet hook receptacle. Because the receptacle is formed from an unbroken sheet of material, it is impossible to see the carpet hook when installing the floor liner. The embodiments provide several features that assist in engaging the carpet hook receptacle with the carpet hook. One of these features is a ridge that extends from the bottom surface of the floor mat around the carpet hook receptacle. This ridge extends at least as far as nibs formed on the bottom surface of the mat such that the ridge can engage with the carpet hook before the nibs begin to engage with the carpet thereby making it easier to align the carpet hook receptacle with the carpet hook. A second feature of the carpet hook receptacle is a frustoconical guide that shifts the carpet hook receptacle as it is lowered onto the carpet hook so that the carpet hook is aligned with a chamber opening of the carpet hook receptacle. A third feature that assists in engaging the carpet hook receptacle with the carpet hook is the shape of the opening to the chamber. This shaped opening is smaller than a head of the carpet hook and includes a central opening portion and at least one opening lobe. This opening lobe makes it easier for the material around the opening to expand as the head of the carpet hook is forced through the opening thereby making it easier to push the head of the carpet hook through the opening and into the chamber where the head of the carpet hook can secure the floor mat to the floor.

Figure 1:
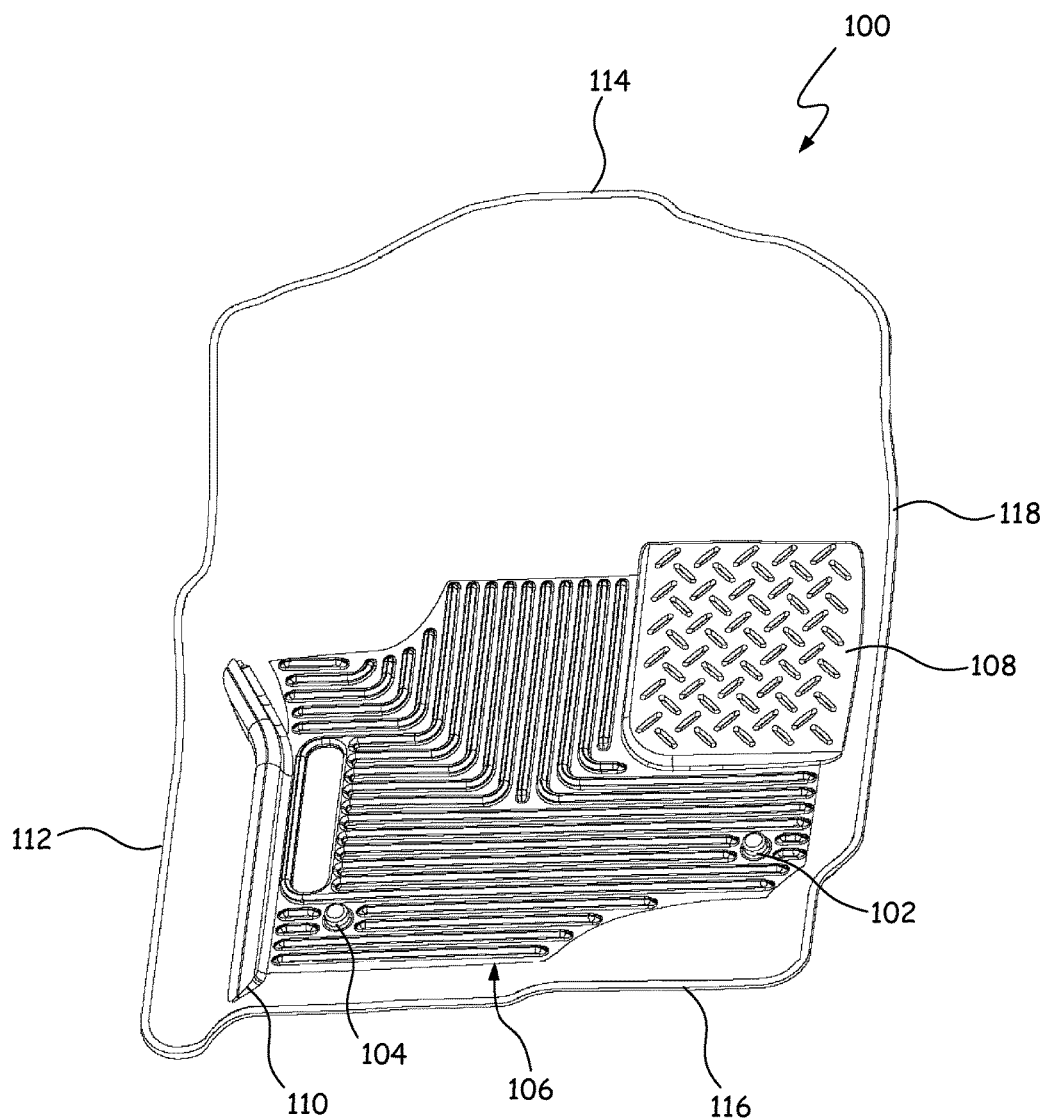
FIG. 1 is a perspective view of a floor mat in accordance with one embodiment.

FIG. 1 provides a perspective view of a floor mat or floor liner 100 showing two carpet hook receptacles 102 and 104, a ribbed foot surface 106 and a heel pad 108. Floor mat 100 is produced as a single unbroken formed sheet of material, which in different embodiments has different degrees of rigidity. Floor mat 100 can be formed through injection molding or thermoforming.

Floor mat 100 is designed to be positioned in a foot well of a vehicle where the vehicle's driver places his feet. For embodiments with low rigidity, the mat bends to follow the contour of the foot well. For embodiments with relatively high rigidity, the mat is formed so that its contours match the contours of the foot well. For example, a forward portion 114 of floor mat 100 is designed to match the inclined contour of a surface at the front of the foot well, a back surface 116 of floor mat 100 is designed to match the contour of an inclined surface next to the seat of the driver and a right side surface 118 is designed to match the contour of an inclined surface on the right side of the foot well in the vehicle. Floor mat 100 also includes a raised side barrier 110 that extends higher than the contour of the foot well and is designed to prevent liquid from flowing over a left side 112 of floor mat 100, especially during turns. Together, forward portion 114, back surface 116, right side surface 118 and raised side barrier 110 trap liquid so that it remains in ribbed foot surface 106. The raised ribs in ribbed foot surface 106 keep the liquid away from the driver's shoes and pant legs.

As shown, carpet hook receptacles 102 and 104 are positioned within ribbed foot surface 106. As a result, when liquid is spilled or when snow melts on mat 100, the liquid will be contained on mat 100 so that it comes into contact with carpet hook receptacles 102 and 104. By producing mat 100 as a formed unbroken sheet of material, there are no openings at carpet hook receptacles 102 and 104 and the liquid that comes into contact with carpet hook receptacles 102 and 104 is not able to penetrate mat 100.

Figure 2:
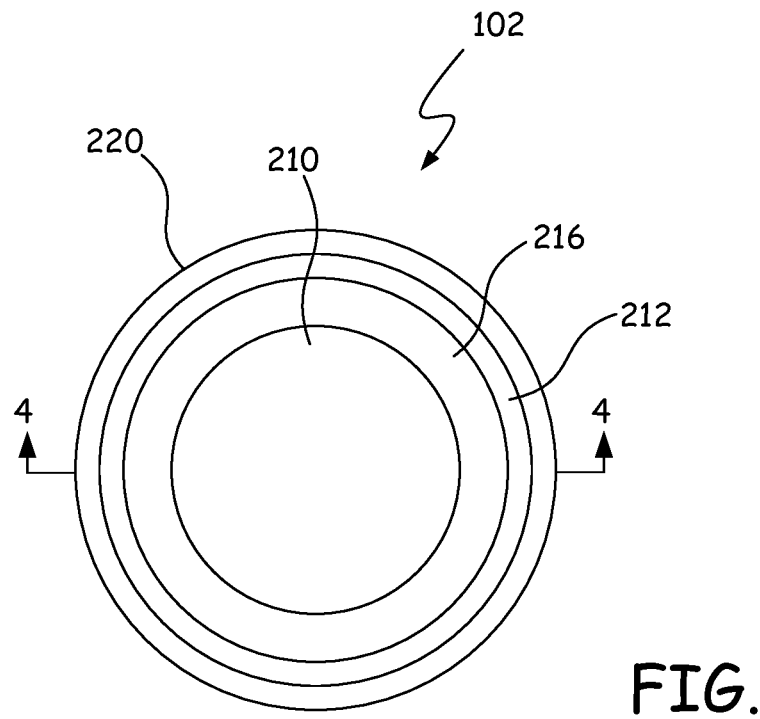
FIG. 2 is a top view of carpet hook receptacle of the floor mat of FIG. 1.
Figure 3:
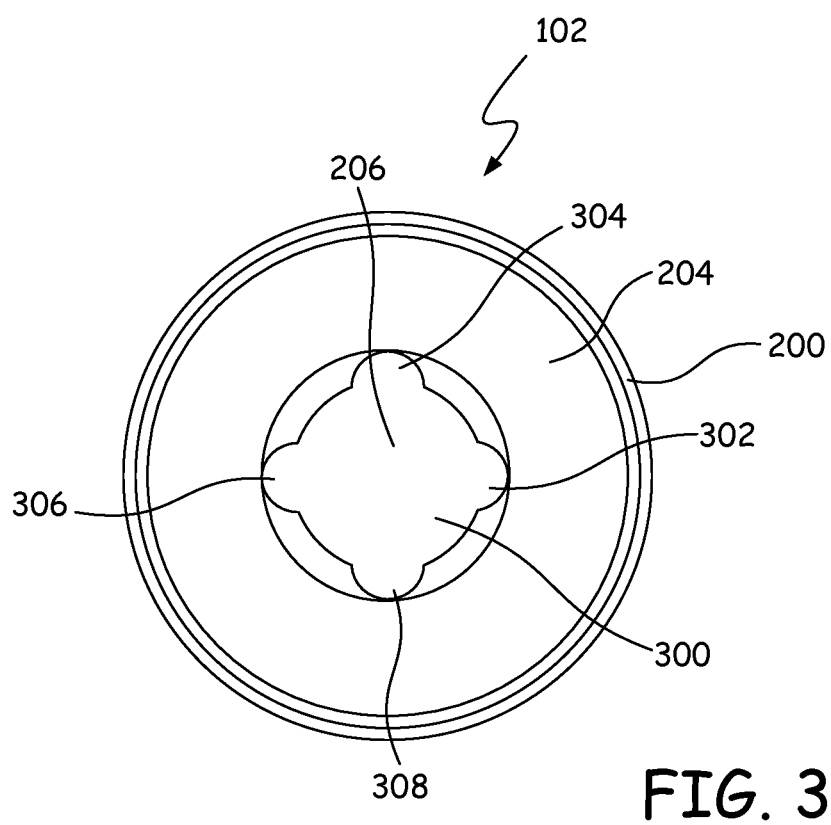
FIG. 3 is a bottom view of the carpet hook receptacle of FIG. 2.
Figure 4:
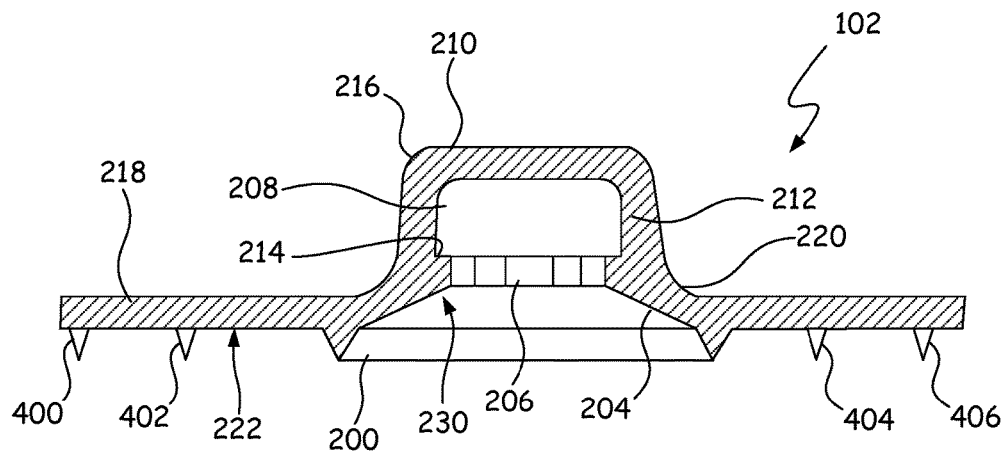
FIG. 4 is a side sectional view of the carpet hook receptacle of FIG. 2.
Figure 5:
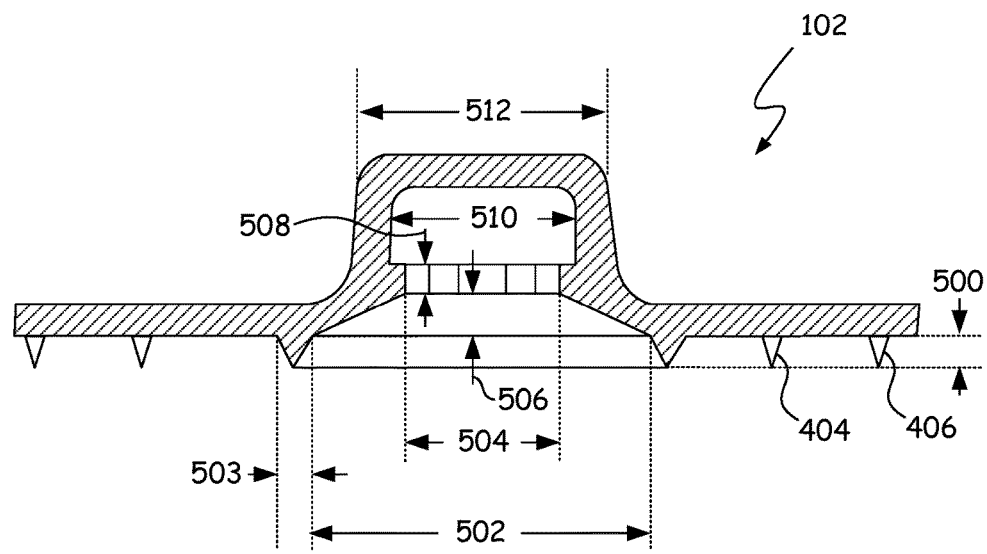
FIG. 5 is the side sectional view of the carpet hook receptacle of FIG. 4 showing various dimensions of the receptacle.
Figure 6:
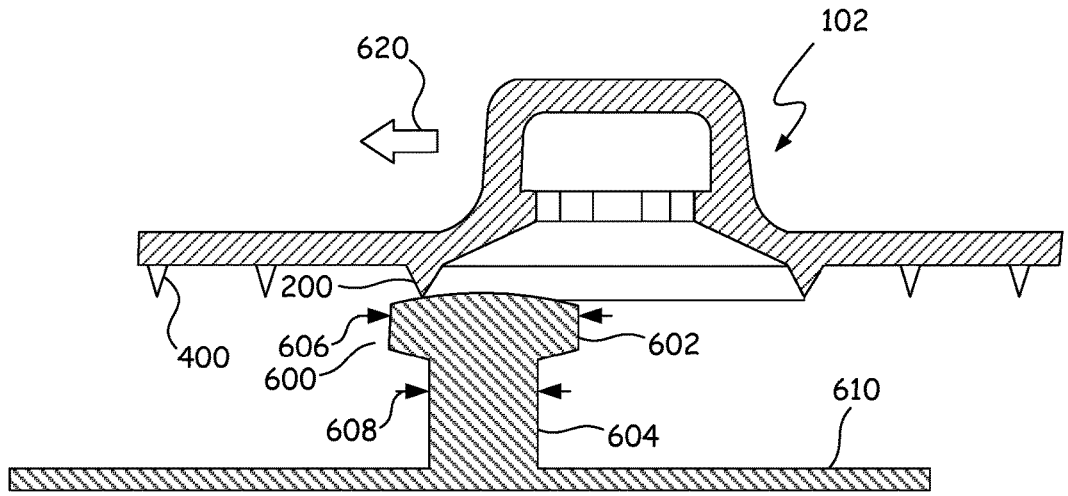
FIG. 6 is a side sectional view the carpet hook receptacle of FIG. 4 being guided onto a carpet hook by a ridge of the receptacle.

FIGS. 2, 3, and 4 provide a top view, a bottom view and a side sectional view of carpet hook receptacle 102. FIG. 5 provides the same view as FIG. 4 and shows various dimensions of carpet hook receptacle 102. Carpet hook receptacle 102 includes a circular ridge 200, a frustoconical guide 204, an opening 206 and a chamber 208 defined by a top 210, sidewalls 212 and a bottom 214. Opening 206 is positioned in bottom 214 of chamber 208. Top 210 is joined to sidewalls 212 by a rounded edge 216 and sidewalls 212 are connected to a top surface 221 of a lateral portion 218 of floor mat 100 by rounded portion 220. Frustoconical guide 204, opening 206 and chamber 208 together define a recess in bottom surface 222 of mat 100.

Ridge 200 is located at the bottom of frustoconical guide 204 and in some embodiments is a continuous ridge around carpet hook receptacle 102. In the embodiments of FIGS. 2-5, ridge 200 is a complete circle. Ridge 200 extends from a bottom surface 222 of lateral portion 218 by a distance 500 as shown in FIG. 5. A plurality of nibs, such as nibs 400, 402, 404 and 406 also extend downwardly from bottom surface 222. In accordance with one embodiment, nibs 400, 402, 404 and 406 extend the same distance 500 below bottom surface 222 as ridge 200. In accordance with one embodiment, height 500 is 0.080 inches. In accordance with the embodiment shown, ridge 200 has a triangular cross-section that at its base has a thickness 503, which in accordance with one embodiment is 0.075 inches.

Frustoconical guide 204, also referred to as a frustoconical recess or funnel 204, includes an angled guide surface 230 that extends from opening 206 to the base of ridge 200. From the point-of-view of opening 206, frustoconical guide 204 extends outwardly below opening 206. In accordance with the embodiment shown in FIGS. 2-5, at the base of ridge 200, frustoconical guide 204 has a diameter 502, which in one embodiment is 1 inch and at opening 206 has a diameter 504, which in one embodiment is 0.370 inches. From the base of ridge 200 to opening 206, frustoconical guide 204 has a height 506, which in one embodiment is 0.125 inches.

Opening, or channel, 206 in bottom 214 of chamber 208 includes a central opening portion 300, which in one embodiment has a circular shape, and four semi-circular lobes 302, 304, 306 and 308, which extend away from central opening portion 300. Although central opening portion 300 is circular in FIG. 3, opening 206 as a whole is non-circular due to the addition of lobes 302, 304, 306 and 308. Lobes 302, 304, 306 and 308 increase the surface area along the perimeter of opening 206 making it easier for the opening to stretch to accommodate a carpet hook head as discussed further below.

Although a circular central opening portion 300 and semi-circular lobes are shown in FIGS. 3-5, in other embodiments, the opening may have a differently shaped central portion and differently shaped lobes. In addition, a different number of lobes either greater than or less than four lobes may be provided in opening 206. For example, in one particular embodiment, a single lobe extends from a central opening portion of the opening.

Bottom 214, also referred to as a bottom wall or bottom structure, where opening 206 is defined, has a thickness 508, which in accordance with one embodiment is 0.075 inches. The widest span 504 of opening 206 is less than a span 510 of chamber 208. As a result, when a head of a carpet hook is inserted into chamber 208, portions of bottom 214 form a ledge that extends below portions of the head. The exteriors of sidewalls 212 are separated by a span 512, which in accordance with one embodiment is 0.72 inches.

In accordance with one embodiment, chamber 208 is circular. In other embodiments, chamber 208 has other shapes.

FIGS. 6-9 show side sectional views of carpet hook receptacle 102 and a carpet hook 600 showing a progression of aligning carpet hook receptacle 102 with carpet hook 600. Carpet hook 600 includes a head 602 that is at the top of a post 604. Head 602 has an exterior diameter 606 that is wider than diameter 608 of post 604. In addition, diameter 606 of head 602 is larger than the widest span 504 of opening 206 and is substantially the same as width or span 510 of chamber 208, which in one embodiment is 0.534 inches.

Figure 7:
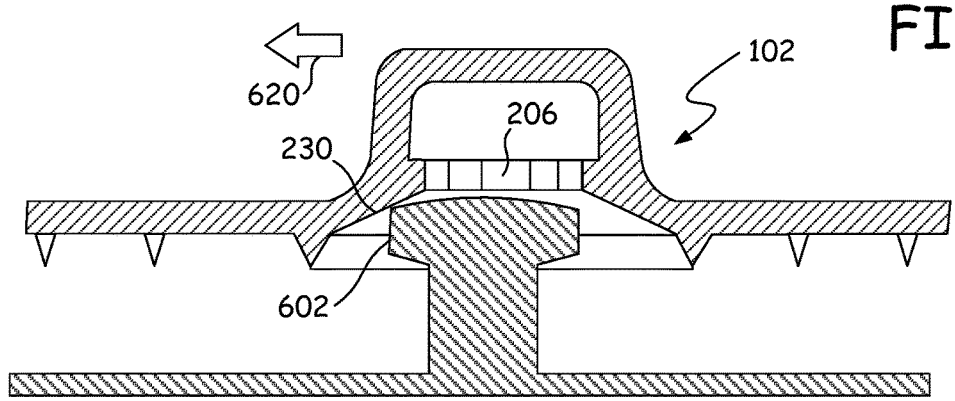
FIG. 7 is a side sectional view the carpet hook receptacle of FIG. 4 being guided onto a carpet hook by a frustoconical recess of the receptacle.

As floor mat 100 is lowered toward carpeting 610, ridge 200 comes into contact with the top of head 602. In this position, the nibs on bottom surface 222 of floor mat 100, such as nibs 400 and 402, that are near ridge 200 have not come in contact with carpeting 610. As a result, it is relatively easy to shift floor mat 100 in a direction 620 so that ridge 200 slips off of the top of head 602 and frustoconical guide 204 comes into contact with head 602 as shown in FIG. 7. Once head 602 is positioned within ridge 200, it is maintained in the area of carpet hook receptacle 102 by ridge 200. As a result, once head 602 is positioned near carpet hook receptacle 102, it tends to remain near carpet hook receptacle 102 making it easier to place carpet hook receptacle 102 over carpet hook 600.

Figure 8:
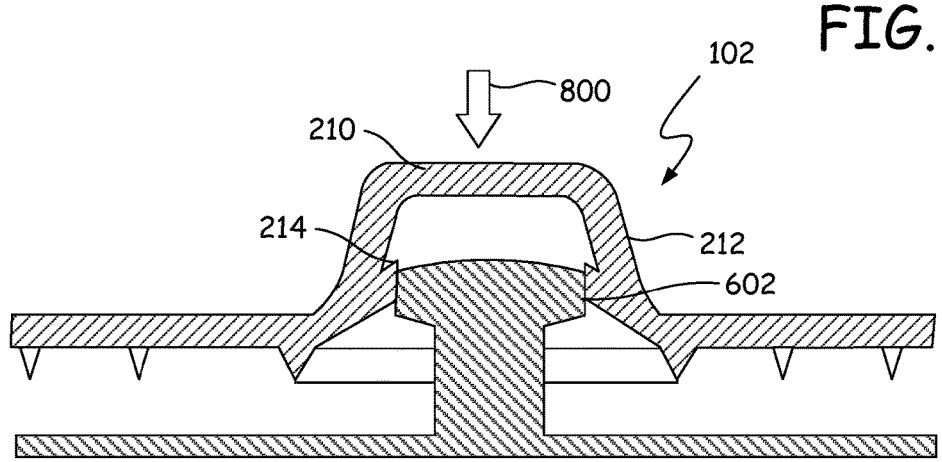
FIG. 8 shows a carpet hook passing through the channel of the carpet hook receptacle of FIG. 4.

As shown in FIG. 7, head 602 of carpet hook 600 contacts angled guide surface 230 of frustoconical guide 204. The weight of floor mat 100 and the inclined nature of angled guide surface 230 cause carpet hook receptacle 102 to shift further in direction 620 thereby aligning head 602 with opening 206 as shown in FIG. 8. Thus, angled guide surface 230 acts as a guide that guides head 602 of carpet hook 600 toward opening 206 of chamber 208.

Figure 9:
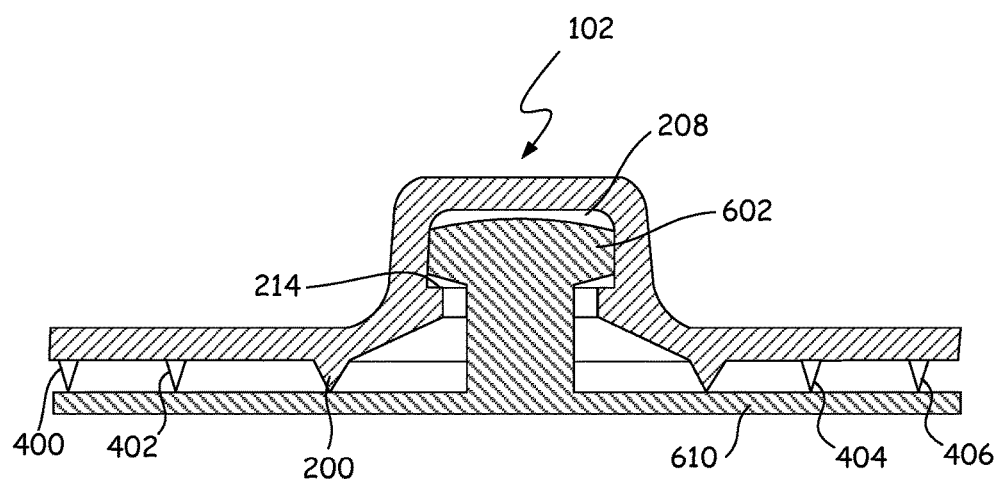
FIG. 9 shows a carpet hook within the chamber of the carpet hook receptacle of FIG. 4.

As shown in FIG. 8, once head 602 is positioned at opening 206, a downward pressure 800 can be applied to top 210 of carpet hook receptacle 102. Downward pressure 800 causes head 602 to expand opening 206 while pushing out sidewalls 212 slightly and bending bottom 214 of chamber 208 upward. The lobes of opening 206 assist in the expansion of opening 206 as downward pressure 800 is applied thereby making it easier for head 602 to enter chamber 208. As shown in FIG. 9, after head 602 has fully entered chamber 208, opening 206 contracts and portions of bottom 214 extend below head 602. As a result, it becomes more difficult to lift floor mat 100 away from carpeting 610. As shown in FIG. 9, ridge 200 engages with carpeting 610 as do nibs 400, 402, 404 and 406. As a result, ridge 200 helps to prevent floor mat 100 from shifting laterally in the vicinity of carpet hook receptacle 102.

Although all of the features have been shown together in a single embodiment, in other embodiments, only one or a subset of the features may be present in an embodiment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A vehicle floor liner comprising:
   a top surface and a bottom surface, the bottom surface comprising:
   a recess extending toward the top surface; and
   a ridge extending away from the bottom surface and positioned around a periphery of the recess,
   wherein the bottom surface further comprises a plurality of nibs, and wherein the plurality of nibs extend a same distance away from the bottom surface as the ridge, and
   wherein the recess comprises a channel leading into a chamber, and wherein the channel has a smaller span than the chamber.

2. The vehicle floor liner of claim 1 wherein the ridge extends continuously around the periphery of the recess.

3. The vehicle floor liner of claim 1 wherein the recess is sealed such that fluids cannot pass from the top surface to the bottom surface through the recess.

4. The vehicle floor liner of claim 1 wherein the channel comprises a central opening portion and at least one lobe opening portion extending from the central opening portion.

5. The vehicle floor liner of claim 4 wherein the central opening portion has a circular shape and each lobe opening portion has a semi-circular shape.

6. The vehicle floor liner of claim 1 wherein the recess further comprises a funnel extending from the ridge to the channel.

7. A vehicle floor mat comprising:
   a carpet hook receptacle comprising:
      a carpet hook-receiving chamber having an opening in a bottom structure of the carpet hook-receiving chamber, and the carpet hook-receiving chamber being closed on the sides and the top; and
      a frustoconical recess formed in a bottom surface of the floor mat and below the carpet hook-receiving chamber, and the frustoconical recess providing a frustoconical guide surface positioned to guide a carpet hook into the opening of the carpet hook-receiving chamber;
   wherein the frustoconical guide surface defines a span of the frustoconical recess that is greater than a span of the carpet hook receiving chamber.

8. The vehicle floor mat of claim 7 wherein the bottom structure of the carpet hook-receiving chamber defines a span of the opening, and wherein the bottom structure is flexible to permit the carpet hook having a corresponding span that is greater than the span of the opening to pass through the opening.

9. The vehicle floor mat of claim 8 wherein the bottom structure of the carpet hook-receiving chamber includes at least one ledge that is flexible to permit the carpet hook having the corresponding span of the carpet hook that is greater than the span of the opening to pass through the opening.

10. The vehicle floor mat of claim 9 wherein the floor mat includes a lateral portion extending from the carpet hook receptacle to peripheral edges of the floor mat, and wherein the lateral portion and the carpet hook receptacle comprise a single-piece component.

11. The vehicle floor mat of claim 7 wherein the opening is non-circular and the chamber is circular.

12. The vehicle floor mat of claim 7 further comprising a ridge protruding from the bottom surface of the mat at a bottom of the frustoconical recess.

13. The vehicle floor mat of claim 12 further comprising a plurality of nibs that extend from the bottom surface of the mat, wherein ridge extends a same distance from the bottom surface of the mat as each of the plurality of nibs.

14. The vehicle floor mat of claim 7 wherein the floor mat includes a lateral portion extending from the carpet hook receptacle to peripheral edges of the floor mat, and wherein the lateral portion and the carpet hook receptacle comprise a single-piece component.

15. A vehicle floor liner comprising:
   a carpet hook receptacle comprising:
      a carpet hook-receiving chamber having a top, a bottom and sides, and the carpet hook-receiving chamber being closed on the sides and the top; and
      an opening in the bottom being at least partially defined by a plurality of ledges that are flexible to permit a carpet hook having a span that is greater than a corresponding span of the opening to pass through the opening; and
   a lateral portion extending from the carpet hook receptacle to peripheral edges of the floor mat, and wherein the lateral portion and the carpet hook receptacle are both comprised of a single-piece component that is not a combination of multiple pieces.

16. The vehicle floor liner of claim 15 wherein the opening includes a lobe-shaped portion positioned between adjacent ends of the plurality of ledges.

17. The vehicle floor liner of claim 15 wherein the carpet hook receptacle further comprises an angled guide surface extending outwardly below the opening.

18. The vehicle floor liner of claim 17 wherein the carpet hook receptacle further comprises a ridge positioned at a bottom of the angled guide surface.

19. The vehicle floor liner of claim 18 wherein the ridge extends continuously around the carpet hook receptacle.

* * * * *